Patented Aug. 16, 1932

1,871,466

UNITED STATES PATENT OFFICE

ALBIN PETER, OF BASEL, SWITZERLAND, ASSIGNOR TO THE FIRM OF CHEMICAL WORKS FORMERLY SANDOZ, OF BASEL, SWITZERLAND

MANUFACTURE OF 1-AMINOANTHRAQUINONE-2-SULPHONIC ACID

No Drawing. Application filed March 5, 1931, Serial No. 520,471, and in Germany March 11, 1930.

This invention relates to a process for the manufacture of 1-aminoanthraquinone-2-sulphonic acid.

Several processes for the preparation of 1-aminoanthraquinone-2-sulphonic acid are known. According to the process described in the German Patent No. 489,460, this sulphonic acid is prepared by baking the acid sulphate of 1-aminoanthraquinone and it is stated therein that by using raw aminoanthraquinone the yield is 75% of the theory, whilst by using an aminoanthraquinone that has been recrystallized from nitrobenzene about 90% of the theory is obtained. According to the British Patent No. 311,977 it is possible to avoid the purification of the aminoanthraquinone by mixing before heating the acid sulphate with oxalic acid.

The aminoanthraquinone can also be sulphonated by heating it with fuming sulphuric acid, but as said in the German Patent 484,997 it is necessary to add to the melt a certain amount of a sulphate, such as sodium or potassium sulphate, in order to avoid the formation of disulphonic acid and of aminooxysulphonic acid and to obtain the highest yield of 1-aminoanthraquinone-2-sulphonic acid which is about 90% of the theory.

The first two processes cited above possess, compared to that of the German Patent No. 484,997 some advantages. Thus, it is possible to prepare 1-aminoanthraquinone-2-sulphonic acid without using fuming sulphuric acid or with a smaller quantity of sulphuric acid. But they also show some drawbacks. The process of the German Patent No. 489,460 uses as starting material an aminoanthraquinone which has been purified by recrystallization from nitrobenzene in order to separate it from inorganic impurities, as otherwise the yield of sulphonic acid reaches only about 75%, and the sulphonic acid obtained forms a hard cake which is difficult to work up. Although it may be possible to obviate these drawbacks by adding to the baking mass some oxalic acid, the transformation of aminoanthraquinone into its acid sulphate is a disagreeable operation that needs a special apparatus for evaporating to dryness under a continuous stirring the pap of aminoanthraquinone and aqueous sulphuric acid.

It has now been found that it is possible to prepare 1-aminoanthraquinone-2-sulphonic acid in a very simple manner by mixing dry finely powdered 1-aminoanthraquinone with such a quantity of a dry acid alkalimetal sulphate that on each molecule of aminoanthraquinone at least one molecule of sulphuric acid will be present, heating the mixture thus prepared in a suitable stove, spread out therein in thin layers, to a temperature between 210 and 240° C. and driving off the water steam produced, by means of a current of gas or by evacuating the stove. In this way raw 1-aminoanthraquinone-2-sulphonic acid is obtained in form of a loose brown powder from which a small black residue is separated by washing out in water and filtering. The yield is 90–95% of the theory.

From the U. S. Patent No. 885,248 wherein 1-aminoanthraquinone by heating with bisulphate is transformed into indanthrene, which reaction takes place at temperatures above 240° C., and from the German Patent No. 489,460 wherein the formation of polymolecular condensation products from raw aminoanthraquinone which usually contains inorganic catalyzers is disclosed, there could not be foreseen or derived that between 210 and 240° C. the bisulphate acts only as a sulphonating agent.

In view of the above statements, the new process possesses the further advantage, that the presence of heavy metal salts, such as iron, copper, lead and mercury salts does not affect the yield of sulphonic acid. This is especially of a great importance for the technical use of this process, as it allows the use of raw aminoanthraquinone and simple devices. The present process, as compared to the known ones, represents, therefore, a great technical progress.

The improved process is illustrated by the following example which is not limitative, the parts being by weight.

Example 44.6 parts of finely powdered 1-aminoanthraquinone are thoroughly mixed with 55.5 parts of sodium bisulphate, containing 21.6 parts of sulphuric acid, and spread out in thin layers in a suitable stove. The mixture is then heated therein in vacuo for 3 hours at 215–220° C., cooled down and the loose brown mass obtained is boiled with 1000 parts of water. By filtering the solution, a small quantity of an insoluble black residue is separated and the sodium salt of 1-aminoanthraquinone-2-sulphonic acid is isolated by means of common salt. The product obtained after drying constitutes, according to the conditions of crystallization, a yellow, red or red brown powder.

In this example, instead of sodium bisulphate, potassium or ammonium bisulphate can be used.

What I claim is:—

1. A process for the preparation of 1-aminoanthraquinone-2-sulphonic acid, consisting in heating to 210–240° C. a mixture of 1-aminoanthraquinone with such a quantity of an acid alkali sulphate that on each molecule of aminoanthraquinone at least one molecule of sulphuric acid will be present, while the water steam formed is eliminated during the heating.

2. A process for the preparation of 1-aminoanthraquinone-2-sulphonic acid, consisting in heating in vacuo to 210–240° C. a mixture of 1-aminoanthraquinone with such a quantity of an acid alkali sulphate that on each molecule of aminoanthraquinone at least one molecule of sulphuric acid will be present.

In witness whereof I have hereunto signed my name this 20th day of February, 1931.

ALBIN PETER.